United States Patent
De Fazio

(10) Patent No.: US 7,939,609 B2
(45) Date of Patent: May 10, 2011

(54) REDISPERSING AGENTS FOR REDISPERSIBLE POLYMER POWDERS AND REDISPERSIBLE POLYMER POWDERS INCLUDING SAME

(75) Inventor: Valentino De Fazio, Pascoe Vale South (AU)

(73) Assignee: Acquos Pty Ltd, Campbellfield, Victoria (AU)

( * ) Notice: Subject to any disclaimer, the term of this patent is extended or adjusted under 35 U.S.C. 154(b) by 417 days.

(21) Appl. No.: 11/664,321

(22) PCT Filed: Sep. 22, 2005

(86) PCT No.: PCT/AU2005/001462
§ 371 (c)(1), (2), (4) Date: Oct. 20, 2008

(87) PCT Pub. No.: WO2006/034531
PCT Pub. Date: Apr. 6, 2006

(65) Prior Publication Data
US 2009/0198017 A1   Aug. 6, 2009

(30) Foreign Application Priority Data

Sep. 28, 2004  (AU) ............................. 2004905612
Dec. 9, 2004   (AU) ............................. 2004907052

(51) Int. Cl.
  C08G 14/08  (2006.01)
  C08G 14/10  (2006.01)
  C08L 61/08  (2006.01)
  C08L 61/24  (2006.01)
  C08L 61/28  (2006.01)

(52) U.S. Cl. ........ 525/504; 525/505; 525/132; 525/134; 525/135; 525/138; 525/502

(58) Field of Classification Search .................. 525/132, 525/134, 135, 138, 502, 504, 505
See application file for complete search history.

(56) References Cited

U.S. PATENT DOCUMENTS

| | | | | |
|---|---|---|---|---|
| 1,841,840 A | * | 1/1932 | Muller | 525/516 |
| 2,127,068 A | * | 8/1938 | Muller | 528/147 |
| 3,063,781 A | * | 11/1962 | Fetscher et al. | 8/94.33 |
| 3,475,113 A | * | 10/1969 | Lucien | 8/94.24 |
| 4,211,856 A | * | 7/1980 | Valgin et al. | 528/141 |
| 4,247,293 A | * | 1/1981 | Wurmli | 8/94.24 |
| 5,155,164 A | * | 10/1992 | Graf et al. | 524/596 |
| 5,225,311 A | * | 7/1993 | Nakano et al. | 430/190 |
| 5,342,916 A | | 8/1994 | Weiser et al. | |
| 5,382,476 A | * | 1/1995 | Weiser et al. | 428/411.1 |
| 5,629,083 A | * | 5/1997 | Teodorczyk | 428/308.8 |
| 5,895,802 A | * | 4/1999 | Weichmann et al. | 525/480 |
| 6,028,167 A | * | 2/2000 | Pakusch et al. | 528/502 E |
| 6,465,567 B1 | | 10/2002 | Grobe et al. | |

FOREIGN PATENT DOCUMENTS

WO  WO2005/021145   3/2005

OTHER PUBLICATIONS

International Search Report, Oct. 27, 2005, (2 pgs).

* cited by examiner

*Primary Examiner* — Randy Gulakowski
*Assistant Examiner* — Mike Dollinger
(74) *Attorney, Agent, or Firm* — Kagan Binder, PLLC

(57) ABSTRACT

A redispersible polymer powder including: a polymer to be redispersed; and an ortho-cresol based condensation product or salt thereof; wherein the ortho-cresol based condensation product or salt thereof includes N-containing units derived from a N-based component incorporated into the ortho-cresol based condensation product or salt thereof during polymerization.

20 Claims, No Drawings

REDISPERSING AGENTS FOR REDISPERSIBLE POLYMER POWDERS AND REDISPERSIBLE POLYMER POWDERS INCLUDING SAME

The present invention relates to redispersing aids for use in the manufacture of redispersible polymer powders and processes for making same. In particular, the invention relates to the use of ortho-cresol based condensation products or salts thereof that include N-containing units derived from a N-based component incorporated into the ortho-cresol based condensation product or salt thereof during polymerisation. The ortho-cresol based condensation polymers or salts thereof advantageously have improved properties over prior art condensation products used for redispersible polymer powders.

The use of redispersible film forming polymers in powder form finds widespread use throughout a number of industries. For example, such redispersible film forming polymers are used as construction binders for tile adhesives, synthetic resin plasters, floor leveling mixes and in areas where a waterless system is generally desirable. These systems in general are produced by the dry blending of the raw materials, such as sand, cement, calcium carbonate, silica flour, modified cellulose based thickeners, and the dry polymer powder, to obtain a ready to use finished product for site mixing where water is added at the point of use. These systems are advantageous as they avoid the need for a two component system, one component containing an aqueous polymer dispersion and the other component containing the powder component which may contain a hydraulic setting component such as cement. Avoiding such systems may be advantageous for a number of reasons such as economy, utility and environmental considerations.

To obtain a film forming polymer in powder form, a liquid dispersion of the polymer is subjected to a drying operation where the water is removed by a suitable method such as spray drying or freeze drying. Spray drying is a widely used and understood method that gives a fine powder which, under well controlled predetermined conditions, does not have to be further processed. This method is therefore generally preferred.

In order to manufacture a redispersible film forming polymer powder with glass transitions below 50° C., it is generally necessary to add to the liquid dispersion before spray drying a quantity of redispersing aid. Redispersing aids act to coat the individual polymer particles to prevent irreversible primary particle formation. Such aids also advantageously increase the yield during the spray drying process by minimizing sticking of the dried polymer to the walls of the spray dryer. The redispersing aid may also improve the storage stability of the polymer powder by minimizing "blocking" (the thermoplastic fusion of the polymer particles under weight pressure), and should generally have some hydrophilic properties to aid redispersability of the polymer powder on the reintroduction of water.

The redispersible polymer powders known to date generally comprise a redispersing aid that is water soluble and which is generally added to the polymer dispersion before spray drying. As stated above, this advantageously prevents or reduces the formation of primary particles during the spray drying operation.

Polyvinyl alcohols have historically been used as redispersing aids for ethylene vinyl acetate (EVA) dispersions for many years. For example, U.S. Pat. No. 3,883,489 assigned to Hoechst Aktinengellschaft makes use of polyvinyl alcohol as a redispersing aid for ethylene vinyl acetate dispersions. Whilst not as effective, polyvinyl alcohols can also be used as redispersing aids in the manufacture of redispersible acrylic or styrene-acrylic polymer powders. For example, U.S. Pat. No. 5,567,750 assigned to Wacker-Chemie GmbH makes use of a polyvinyl alcohol along with an amino functional polyvinyl alcohol for the manufacture of a redispersible styrene-acrylic polymer powder. U.S. Pat. No. 5,519,084 assigned to Air Products and Chemicals makes use of a polyvinyl alcohol as a redispersing aid with an acrylic polymer consisting of up to 15% olefinically unsaturated carboxylic acid. However, polyvinyl alcohols are not entirely satisfactory as redispersing aids for acrylics or styrene acrylics or styrene butadiene dispersions as they are for ethylene vinyl acetate dispersions.

The use of salts of arylsulfonic acid—formaldehyde condensates as redispersing aids is also known, especially for acrylic dispersions. German Offenlegungsschrift 24 45 813 translated as "Redispersible synthetic powder and method of production" describes the use of phenol sulfonic acid formaldehyde condensates and naphthalene sulfonic acid formaldehyde condensates and their alkali salts or their alkali earth metal salts as redispersing aids for redispersible powders. U.S. Pat. No. 5,225,478 assigned to BASF also describes the use of phenol sulfonic acid formaldehyde condensates and their alkali salts or alkali earth metal salts as a redispersing aid. U.S. Pat. No. 6,028,167 assigned to BASF describes an improvement by controlling the molecular weight of the redispersing aids. Likewise, Australian Patent No. 718,907 describes an improvement in naphthalene sulfonic acid formaldehyde condensates by controlling or restricting the molecular weight of the redispersing aids.

The issue of molecular weight control is generally considered important in the manufacture of redispersing aids for redispersible powders. For example, U.S. Pat. No. 6,028,167 describes in example S1 the method of manufacture for a phenol sulfonic acid formaldehyde condensate with a molecular weight of 750. Example S1 was repeated (as Example S2) with the only change being the increased condensation time and hence molecular weight. Example S2 was not as effective as Example S1 as a redispersing aid. During the manufacturing on an industrial scale, therefore, molecular weight control is an important parameter. Furthermore, there is always a residual amount of high molecular weight (>10, 000) components remaining after reaction (Table 1 in same patent—inventive example). This portion of the redispersing aid will not be as effective as the lower molecular weight species that are required for redispersing the polymer powder.

Australian application number 2003904725 to Acquos Pty Ltd describes an ortho-cresol sulfonate condensate based oligomer where a low molecular weight product is obtained with high molecular weight condensates practically eliminated. This provides for considerable improvements in the properties of the manufactured redispersible powders. Whilst the abovementioned low molecular weight product aryl sulfonic acid formaldehyde condensates, such as the phenol sulfonic acid formaldehyde condensate as in U.S. Pat. No. 6,028,167 and the naphthalene sulfonic acid formaldehyde condensate in Australian Patent No. 718,907, are effective redispersing aids, with Australian application number 2003904725 being an especially effective redispersing aid, they all suffer from a major drawback in that the finished colour of the final dry polymer comprising this class of condensation redispersing aid is not entirely satisfactory. The Problem manifests itself as a coloured polymer powder as opposed to a white powder that is manufactured using technologies based on poly vinyl alcohol as a protective colloid or redispersing aid. Mention of this deficiency is made in U.S. Pat. No. 6,127,483 with improvement in colour achieved only by moving away from this class of condensation polymer. Whilst colour is not usually considered an issue when low polymer contents are used in the finished mortars, the problem is exacerbated in higher performance systems and in one pack membrane systems. That is, systems where high levels of redispersible polymer powders are used doing away with a liquid latex component as has been a trend of recent times.

U.S. Pat. No. 5,342,916 proposes a sulfonated phenol urea melamine condensation polymer with improved colour. However, no mention is made of the molecular weight of the polymer and high amount of condensation polymer is required for redispersability. The poor performance can be put down to the high molecular weight of the condensation polymer. The manufacturing processes for these condensation polymers are complex, being multistep reactions and molecular weight being very difficult to control due to the reactive nature of the phenol sulfonic acid with two reactive sites with formaldehyde, and the reactive nature of the urea with two or more reactive sites with formaldehyde.

The present invention aims to provide an alternate redispersing aid for use in the manufacture of redispersible polymer powders. Particularly, a redispersing aid that is suitable for use in systems involving a polymer having a relatively low glass transition temperature. The invention advantageously further provides an industrial process that will make the manufacture of such redispersing aids more reproducible in terms of obtaining low molecular weight condensates with improved colour in the finished products, and more desirable rheological performance in the finished system containing these spray dried polymers.

According to one aspect of the invention there is provided a redispersible polymer powder including:
  a polymer to be redispersed; and
  an ortho-cresol based condensation product or salt thereof;
    wherein the ortho-cresol based condensation product or salt thereof includes N-containing units derived from a N-based component incorporated into the ortho-cresol based condensation product or salt thereof during polymerisation.

According to a further aspect the invention provides the use of an ortho-cresol based condensation product or salt thereof including N-containing units derived from a N-based component incorporated into the ortho-cresol based condensation product or salt thereof during polymerisation as a redispersing aid in a redispersible polymer powder There is also provided a product including, as a binder, the redispersible polymer powder discussed in accordance with this invention. There is still further provided the use of such a redispersible polymer powder as a binder for a product, such as for example hydraulically setting compositions, adhesives, coating compositions, synthetic resin renders, and for modifying building materials.

As used herein, the term "ortho-cresol based condensation product" primarily includes ortho-cresol sulfonic acid formaldehyde condensation polymers and (ortho-cresol/phenol) sulfonic acid formaldehyde condensation polymers, but may also include within its ambit mixed condensation polymers of ortho-cresol sulfonic acid with other monomers suitable for such condensation reaction, more specifically their sulfonated product.

The N-based component incorporated into the ortho-cresol based condensation product or salt thereof may take any suitable form. For example, this may be amino based organic material that will undergo a condensation reaction with formaldehyde and ortho-cresol, such as melamine. Most preferred, however, is urea. Accordingly, the ortho-cresol based condensation product or salt thereof is preferably an ortho-cresol sulfonic acid/urea based condensation product and/or an ortho-cresol sulfonic acid/urea and melamine based condensation product.

In certain embodiments, the N-based component incorporated into the ortho-cresol based condensation product or salt thereof may also be provided in a sulfomethylated, sulfated or sulfonated form. This may advantageously render the product more hydrophilic. The sulfomethylated, sulfated or sulfonated N-based component, which it will be appreciated is a subgroup of the N-based component above, may be any of the above mentioned N-based components that have been treated with methods known to workers in the field. An example of a method is outlined in U.S. Pat. No. 5,424,390 to Dupuis et al. Particularly preferred is melamine sulfomethylated with sodium metabisulfite in formaldehyde.

Particularly preferred ortho-cresol based condensation products or salts thereof are those incorporating up to 2.0, preferably from 0.5 to 2.0, and more preferably less than 0.5 mole of N-based component per mole of ortho-cresol.

It has surprisingly been found that the amount of N-based component required to achieve the required results is quite effective at less than 0.5 moles of N-based component per mole of ortho-cresol.

While not wanting to be bound by any theory as to why the products of this invention are effective, the following serves as a guide that is not intended to limit the scope of the invention in any way, but which serves as information as to the most likely synthesis products of the invention.

The ortho-cresol based condensation product or salt thereof is, in one embodiment, an ortho-cresol sulfonic acid, N-based aminoplast formaldehyde condensation product which may be manufactured by a method including:
  (i) sulfonating ortho-cresol with sufuric acid; and
  (ii) condensing the sulfonated ortho-cresol with the N-based component and formaldehyde.

The first step of this embodiment of the invention involves the sulfonation of ortho-cresol with sulfuric acid under slightly greater than equimolar concentration (i.e. slight excess of sulfuric acid). The sulfuric acid can be concentrated sulfuric acid, oleum or sulfuric containing up to 15% water. Sulfonation of ortho-cresol is generally an ortho/para reaction relative to the hydroxyl group. However, at selected temperatures, sulfonation normally proceeds in the para position relative to the hydroxyl group due to reasons such as steric hindrance among other kinetic reasons, as opposed to the only ortho position that is available. This first step would predominantly form ortho-cresol sulfonic acid with the sulfonic group in the para position to the hydroxyl radical. The addition of the sulfuric acid preferably takes place at from 35 to 60° C. with the final sulfonation preferably taking place at higher temperatures (such as from 85 to 105° C.).

The second step involves the condensation of the sulfonated ortho-cresol with the N-based component and formaldehyde, preferably at a temperature of from room temperature to about 100° C. The time required for condensation will be dependent on the temperature used and the amount of water during the condensation step. As condensation is predominantly ortho/para, the condensation will only take place at the remaining ortho position of the ortho-cresol sulfonic acid. The predominant product manufactured is a controlled molecular weight condensation product composed of an ortho-cresol sulfonic acid and N-based component. The ortho-cresol sulfonic acid is therefore a functional molecule in that it introduces a sulfonic acid group and acts as a molecular weight regulator.

According to an alternative embodiment the ortho-cresol N-based condensation product or salt thereof is an orthocresol sulfonic acid mixed condensation product which may be manufactured by a method including:

(i) sulfonating ortho-cresol with sufuric acid under a slight excess of sulfuric acid; and (ii) condensing the sulfonated ortho-cresol and N-based product with another compatible monomer.

In this embodiment, the ortho-cresol sulfonic acid is used as a molecular weight regulator for the production of mixed condensation polymers with monomers such as cresol (mixed isomers), phenol, resorcinol, naphthalene, meta-cresol, para-cresol as well as their respective sulfonated acids, while the N-based product present provides for improved properties described above.

While other combinations of oligomers will be present in the resultant reactant products, the products are generally low molecular weight species that are effective and are within the molecular weight range that is preferred for a redispersing aid for redispersible polymer powders. More importantly, high molecular weight species are significantly reduced or eliminated using the above mentioned steps. It is thought that this is true so long as the sulfonation of the ortho-cresol is complete in the first step (to reduce the reactive sites for condensation to only one remaining ortho position), and a significant amount of ortho-cresol is used to regulate the molecular weight of the final product. The final product may be neutralized prior to use with a base.

As previously noted, the amount of N-based component generally used is up to 2 mole per mole of ortho-cresol sulfonic acid, for example in the case of sulfomethylated N-based component, or preferably less than 0.5 mole per mole of ortho-cresol sulfonic acid when urea and/or melamine type products are used. More preferably, up to 0.5 moles of N-based component, such as urea and melamine, is quite sufficient to achieve the desired results without having to use excessive N-based component whilst performing the condensation reaction at quite moderate temperatures.

The ortho-cresol based condensation product or salt thereof, preferably ortho-cresol sulfonic acid urea formaldehyde condensate, is generally used in the form of its salts. The salts will generally include the alkali metal salts or the alkaline earth metal salts. Ammonium salts or organic amine salts may also be used. Preferred salts are the calcium salts or the sodium salts or combination of these.

The present invention also provides for the use of ortho-cresol based condensation product or salts thereof as described above, particularly ortho-cresol sulfonic acid urea formaldehyde condensate and its salts, as a redispersing aid in the preparation of redispersible polymer powders. Preferably the ortho-cresol/N-based condensation product or salt thereof is added at a level of from about 1% to about 30% by weight of solid ortho-cresol based condensation product or salt thereof relative to the solid polymer powder, more preferably from about 1% to about 15%. This illustrates an advantage of the inventive powders over the products of the prior art which generally require larger amounts of redispersing aid based on the weight of the polymer.

The polymers that may be used in combination with the ortho-cresol/N-based condensation product or salt thereof are generally those with glass transitions below 50° C. Most preferred are flexible polymers which generally have a glass transition below 5° C. For example, polymers manufactured using emulsion polymerisation techniques. Polymers may be pure acrylic polymers (example based on methylmethacrylate and alkyl acrylates such as butyl acrylate), styrene-acrylic (example based on styrene and alkyl acrylates such as 2-ethylhexyl-acrylate), vinyl acetate copolymers with alkyl acrylate or ethylene or maleates, and styrene-butadiene based polymers. More particularly, the polymer may preferably contain two or more monomers selected from the group consisting of styrene, methylmethacrylate, vinyl acetate, butadiene, n-butyl acrylate, 2-ethylhexylacrylate, ethylacrylate, methylacrylate, ispropylacrylate, vinyl propionate, dibutyl maleate, ethylene, tert-butyl acrylate, methacrylic acid, acrylic acid, acrylamide, methacrylamide, hydroxyethyl methacrylate.

The type of polymer to be used within this invention, however, is not restricted on the combination referred to above, but most polymers used in industry, used in the manufacture of construction products, and used as an anionic or nonionic dispersion polymer in water, will generally be able to be used with the ortho-cresol based condensation polymer or salt thereof so long as the two components are compatible when mixed in liquid form before drying, particularly spray drying. Examples of these types of polymers are generally those referred to in the description in Australian Patent No. 717,206 which is incorporated herein in its entirety by reference thereto. The type of polymer is not critical for the use of the invention.

The ortho-cresol/N-based condensation product or salt thereof is generally mixed with the polymer dispersion before drying. The resultant mixture is then preferably spray dried using conventional spray drying techniques. For example, rotating disc atomization, single fluid nozzles or multi fluid nozzles are used for the atomization step along with a drying operation in a chamber preferably using air heated from 120 to 180° C. The resultant polymer powder is preferably collected in cyclones or filter bag houses. Anti-caking agents may also be metered in whilst the polymer powder is suspended in the air stream.

Embodiments of the invention will now be discussed in more detail with reference to the following examples which are provided for exemplification only and which should not be considered limiting on the scope of the invention in any way.

PREPARATIVE EXAMPLE D1

A glass 1 liter laboratory reactor equipped with 2 dosing lines, a variable speed mechanical stirrer, a reflux condenser, a glass thermometer, and a water bath was loaded with 77 grams of deionised water, 0.8 grams of sodium bicarbonate, 0.5 grams of a nonyl phenol ethoxylate with 30 moles of ethylene oxide, 0.35 grams of a solid sodium salt of a sulfated nonyl phenol ethoxylate with 30 moles of ethylene oxide. To the above was added 17 grams from a Feed Mix 1 comprising 78 grams of water, 2 grams of a nonyl phenol ethoxylate with 30 moles of ethylene oxide, 0.7 grams of a solid sodium salt of a sulfated nonyl phenol ethoxylate with 30 moles of ethylene oxide, 5 grams of acrylamide, 144 grams of butyl acrylate, and 96 grams of styrene and was heated to 85 degrees celcius. Once the temperature had reached 85° C., 2 grams of a Feed Mix 2 was added which comprised 22 grams of water with 1.6 grams of sodium persulfate. The reactor loading was allowed to react for 10 minutes. The remainder of Feed Mix 1 was then fed over 2 hours whilst the remaining Feed Mix 2 was fed over 2 hours and 10 minutes. The contents of the reactor flask was held at 85° C. by controlling the temperature of the water bath. The agitator speed was around 400 rpm. At the end of the feeds, the reaction product was held for 30 minutes at 85° C. 0.5 grams of TBHP (70% solution) was then added in 2 grams of water and the reaction product was allowed to cool to room temperature. A mixture comprising 2 grams of ammonia in 2 grams of water was then added to bring the pH above 7. The product was filtered through a 200 micron screen and gave a polymer dispersion with a solids content of 57% with an onset glass transition (as measured with a Shimadzu DSC-60 differential scanning colorimeter) of −3° C.

Comparative Example 1

(Ortho-Cresol Sulfonate Formaldehyde Condensate as per Australian Application Number 2003904725)

A glass 5 litre laboratory reactor equipped with 1 dosing line, a variable speed mechanical stirrer, a reflux condenser and a water bath was loaded with 350 grams of ortho-cresol and heated to 40° C. At 60° C., 390 grams of sulfuric acid (98%) was added over 40 minutes and the temperature of contents was then heated at 85-95° C. for 75 minutes. The contents of the reactor were there again cooled to 60° C. and 1400 grams of water was added. A mixture comprising 180 grams of formaldehyde (30% in water) was then dosed into the reactor over 30 minutes and the contents were then heated at 85-95° C. for 2.5 hours. The contents of the reactor was then dropped into 3850 grams of water and neutralized and made into the Calcium salt to pH 7 with an appropriate alkali.

To 3400 grams of the above solution, there was added 7000 grams of polymer dispersion as prepared in example D1 and the final product was spray dried spray dried in a "Niro production minor" spray drier as manufactured by Niro Denmark refitted with a "Nubilosa" nozzle as manufactured by Nubilosa Germany. The inlet temperature was 130° C. and the air outlet was set to 50% maximum. Fine talc was metered into the air stream at 2-3% based on solid polymer.

EXAMPLE 1

Inventive Example with 0.45 mole Urea per Mole Orthocresol

A glass 5 litre laboratory reactor equipped with 1 dosing line, a variable speed mechanical stirrer, a reflux condenser and a water bath was loaded with 400 grams of ortho-cresol and heated to 40° C. At 60° C., 600 grams of sulfuric acid (98%) was added over 40 minutes and the temperature of contents was then heated at 85-95° C. for 75 minutes. The contents of the reactor were there again cooled to 70° C. and 250 grams of water was added, followed immediately by 1000 grams of a 10% aqueous urea solution. A mixture comprising 500 grams of formaldehyde (30% in water wt/wt) was added into the reactor and the contents were then heated at 60-80° C. for a further 1 hour. The contents of the reactor was then dropped into 5000 grams of water and neutralized and made into the Calcium salt to pH 7 with an appropriate alkali.

To 3400 grams of the above solution, there was added 7000 grams of polymer dispersion as prepared in Example D1 and the final product was spray dried spray dried in a "Niro production minor" spray drier as manufactured by Niro Denmark refitted with a "Nubilosa" nozzle as manufactured by Nubilosa Germany. The inlet temperature was 130° C. and the air outlet was set to 50% maximum. Fine talc was metered into the air stream at 2-3% based on solid polymer.

EXAMPLE 2

Inventive Example with Sulfomethylated Melamine

A glass 6 litre laboratory reactor equipped with 1 dosing line, a variable speed mechanical stirrer, a reflux condenser and a water bath was loaded with 400 grams of ortho-cresol and heated to 40° C. At 60° C., 600 grams of sulfuric acid (98%) was added over 40 minutes and the temperature of contents was then heated at 85-95° C. for 75 minutes. To the orthocresol sulfonic acid, there was added whilst stirring 2000 grams of water and 2500 grams of a precondensate manufactured reacting 3800 grams of water, 500 grams of melamine 20 grams of caustic soda (50% in water), 1200 grams of Formaldehyde solution (37%) and 400 grams of sodium metabisulfite reacted at 85 degrees for 2 hours. The solution was then dropped into 1000 grams of water.

To 3400 grams of the above solution, there was added 7000 grams of polymer dispersion as prepared in Example D1 and the final product was spray dried spray dried in a "Niro production minor" spray drier as manufactured by Niro Denmark refitted with a "Nubilosa" nozzle as manufactured by Nubilosa Germany. The inlet temperature was 130° C. and the air outlet was set to 50% maximum. Fine talc was metered into the air stream at 2-3% based on solid polymer.

Comparative Example P1

A test mixture comprising 400 grams of white Portland cement, 600 grams white dry sand and 150 grams of redispersible polymer from Comparative Example 1 was blended and to this mixture was added 180 grams of water and cast as a slurry on polypropylene film and allowed to dry for 24 hours.

OBSERVATION 1: The product showed excellent redispersability on mixing with water.
OBSERVATION 2: The film displayed excellent flexibility after drying.
OBSERVATION 3: The colour of the film was off white with highly coloured stains showing signs of leaching and bleeding of the condensation polymer.

EXAMPLE P1

A test mixture comprising 400 grams of white Portland cement, 600 grams white dry sand and 150 grams of redispersible polymer from Example 1 was blended and to this mixture was added 180 grams of water and cast as a slurry on polypropylene film and allowed to dry for 24 hours.

OBSERVATION 1: The product showed excellent redispersability on mixing with water.
OBSERVATION 2: The film displayed excellent flexibility after drying.
OBSERVATION 3: The film displayed excellent colour.

EXAMPLE P2

A test mixture comprising 400 grams of white Portland cement, 600 grams white dry sand and 150 grams of redispersible polymer from Example 2 was blended and to this mixture was added 180 grams of water and cast as a slurry on polypropylene film and allowed to dry for 24 hours.

OBSERVATION 1: The product showed excellent redispersability on mixing with water.
OBSERVATION 2: The film displayed excellent flexibility after drying.
OBSERVATION 3: The film displayed excellent colour.

The reference to any prior art in this specification is not, and should not be taken as, an acknowledgment or any form of suggestion that that prior art forms part of the common general knowledge in Australia.

The invention has been described by way of non-limiting example only and many modifications and variations may be made thereto without departing from the spirit and scope of the invention described.

The invention claimed is:

1. A redispersible polymer powder including:
   a polymer to be redispersed; and
   an ortho-cresol based condensation product or salt thereof including N-containing units derived from a N-based component incorporated into the ortho-cresol based condensation product or salt thereof during the condensation polymerization reaction;
   wherein less than 0.5 mole of the N-based component per mole of ortho-cresol is incorporated into the ortho-cresol based condensation product or salt thereof, and wherein the ortho-cresol based condensation product or salt thereof is substantially free of species having a molecular weight >10,000.

2. A redispersible polymer powder according to claim 1, wherein the N-based component is an amino based organic material.

3. A redispersible polymer powder according to claim 2, wherein the N-based component is melamine and/or urea.

4. A redispersible polymer powder according to claim 3, wherein the ortho-cresol based condensation product or salt thereof is an ortho-cresol sulfonic acid/urea based condensation product and/or an ortho-cresol sulfonic acid/urea and melamine based condensation product.

5. A redispersible polymer powder according to claim 1, wherein the ortho-cresol based condensation product or salt thereof is an ortho-cresol sulfonic acid, N-based aminoplast formaldehyde condensation product which is manufactured by a method including:
   (i) sulfonating ortho-cresol with sufiiric acid; and
   (ii) condensing the sulfonated ortho-cresol with the N-based component and formaldehyde.

6. A redispersible polymer powder according to claim 1, wherein the ortho-cresol condensation product or salt thereof is an ortho-cresol sulfonic acid mixed condensation product which is manufactured by a method including:
   (i) sulfonating ortho-cresol with sufuric acid under a slight excess of sulfuric acid; and
   (ii) condensing the sulfonated ortho-cresol and N-based product with another compatible monomer.

7. A redispersible polymer powder according to claim 1, wherein the ortho-cresol based condensation product or salt thereof is in the form of a salt.

8. A redispersible polymer powder according to claim 7, wherein the salt is an alkali metal salt or an alkaline earth metal salt.

9. A redispersible polymer powder according to claim 8, wherein the salt is a calcium salt, sodium salt, ammonium salt, organic amine salt or a combination thereof.

10. A redispersible polymer powder according to claim 1, wherein the ortho-cresol based condensation product or salt thereof is added at a level of from about 1% to about 30% by weight of solid ortho-cresol based condensation product or salt thereof relative to solid polymer powder to be redispersed, more preferably from about 1% to about 15%.

11. A redispersible polymer powder according to claim 1, wherein the polymer to be redispersed has a glass transition temperature below 50° C.

12. A redispersible polymer powder according to claim 11, wherein the polymer to be redispersed is a flexible polymer having a glass transition temperature below 5° C.

13. A redispersible polymer powder according to claim 1, wherein the polymer to be redispersed is selected from pure acrylic polymers, styrene-acrylic polymers, vinyl acetate copolymers with alkyl acrylate or ethylene or maleates, and styrene-butadiene based polymers.

14. A redispersible polymer powder according to claim 1, wherein the polymer to be redispersed contains two or more monomers selected from the group consisting of styrene, methylmethacrylate, vinyl acetate, butadiene, n-butyl acrylate, 2-ethylhexylacrylate, ethylacrylate, methylacrylate, ispropylacrylate, vinyl propionate, dibutyl maleate, ethylene, tert-butyl acrylate, methacrylic acid, acrylic acid, acrylamide, methacrylamide, and hydroxyethyl methacrylate.

15. A method of preparing a redispersible polymer powder comprising
   a) providing a solid polymer powder to be redispersed,
   b) providing an ortho-cresol based condensation product or salt thereof including N-containing units derived from a N-based component incorporated into the ortho-cresol based condensation product or salt thereof during polymerization, and
   c) adding the ortho-cresol based condensation product or salt thereof to the solid polymer powder to provide a redispersible polymer powder, wherein less than 0.5 mole of the N-based component per mole of ortho-cresol is incorporated into the ortho-cresol based condensation product or salt thereof, and wherein the ortho-cresol based condensation product or salt thereof is substantially free of species having a molecular weight >10,000.

16. A product including, as a binder, the redispersible polymer powder as claimed in claim 1.

17. A product according to claim 16, wherein said product is selected from hydraulically setting compositions, adhesives, coating compositions and synthetic resin renders.

18. A method of preparing a binder-containing product comprising
   a) providing a redispersible polymer powder as claimed in claim 1
   b) formulating a product using the redispersible polymer powder as a binder for the product.

19. The method of claim 18, wherein the product is, selected from hydraulically setting compositions, adhesives, coating compositions and synthetic resin renders.

20. A redispersible polymer powder according to claim 6, wherein the compatible monomer is phenol.

* * * * *